United States Patent Office 3,357,781
Patented Dec. 12, 1967

3,357,781
ANTHRAQUINONE DYESTUFFS FOR POLYESTER ARTICLES AND PROCESS FOR THE DYEING THEREOF
Argento Crotti, Cogliate, Milan, and Pietro Albanese, Milan, Italy, assignors to Aziende Colori Nazionali Affini ACNA S.p.A., Milan, Italy
No Drawing. Filed Mar. 18, 1964, Ser. No. 352,996
Claims priority, application Italy, Mar. 29, 1963, 6,506/63
10 Claims. (Cl. 8—4)

Our invention relates to a new class of dyestuffs suitable for the dyeing of polyester materials and to a method for preparing such dyestuffs. The invention also relates to a process for dyeing polyester materials with the aid of the above-mentioned dyestuffs.

We have found, and this is the basis for the present invention, that compounds of the formula:

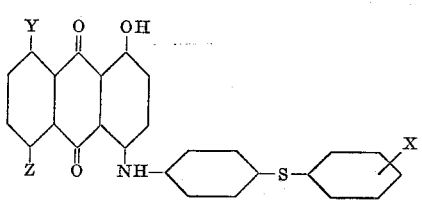 (1)

wherein

X is hydrogen, halogen or an alkyl or alkoxy group,
Y is OH or $NO_2$,
Z is $NO_2$ or OH;

Y and Z are different from each other and have the effect of dyeing polyester materials of the type characterized as polyethylene terephthalate, such as fibers, films, or manufactured articles, with greenish-blue shades of excellent general fastness properties.

The compounds characterized by the above formula are obtained by condensing at temperatures substantially between 130 and 210° C., preferably between 160 and 210° C., a dinitrodioxyanthraquinone with the selected amine, in high boiling solvents, for instance nitrobenzene, alpha-chloronaphthalene and dichlorobenzene. Upon completion of the reaction, the solvent may be partially removed and/or diluted with ethyl alcohol and the condensation product separated. The molar ratio in the reaction mixture between dinitrodioxyanthraquinone and the amine is between 1:3 and 1:8.

The compounds of Formula 1 dye the polyethylenterephthalate with shades having a very high fastnesses light, sublimation, wet treatments and dry-cleaning solvents. The following examples will illustrate specific features, without being intended to limit the broader aspects of the invention.

Example 1

0.5 g. of 4,5-dinitrocrysazine, 10 ml. of alphachloronaphthalene, and 1,8 of 4-aminodiphenylsulphide are reacted at 180° C. for 6 hours. Thereafter, the reaction mass is cooled and diluted with a little ethyl alcohol. The resultant precipitate, separated and washed with a small amount of ethyl alcohol, is finally dried.

A dark-blue and uniform powder is obtained in high yield which dyes the polyethylenterephthalate (at 120°–130° C. from aqueous bath under pressure) in intense green-blue shades, characterized by very high fastnesses to light, sublimation, wet treatments and trichloroethylene dry-cleaning process.

Example 2

The operation is carried out as described in Example 1, but 4,8-dinitroantharufine instead of 4,5-dinitrocrysazine is used. A product having a slightly more reddish shade compared with the preceding one, but exhibiting similar fastness characteristics is obtained.

Example 3

0.5 g. of 4,5-dinitrocrysazine, 1.8 g. of 4-aminodiphenylsulphide, and 10 ml. of nitrobenzene are reacted at 180° C. for 6 hours in the manner set forth in Example 1. The product resulting is identical in characteristics with the material of Example 1.

Example 4

Using the materials of Example 2, but substituting nitrobenzene as the solvent for the alpha-chloronaphthalene yields the dyestuff of Example 2.

We claim:

1. Dyestuffs for polyester fibers having the structure:

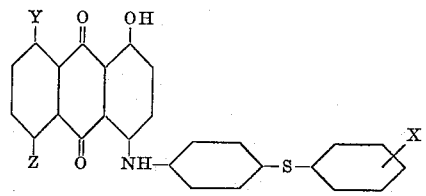

wherein X is hydrogen, Y and Z are chosen from the group consisting of OH, $NO_2$, Y being different from Z.

2. A dyestuff according to claim 1, having the structure:

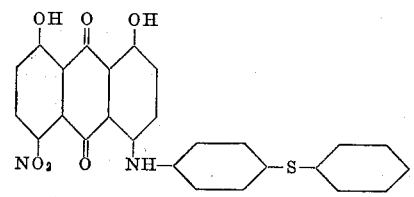

3. A dyestuff according to claim 1, having the structure:

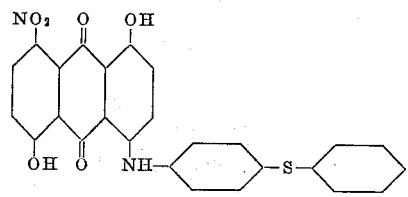

4. The process for the preparation of a dyestuff comprised in the formula:

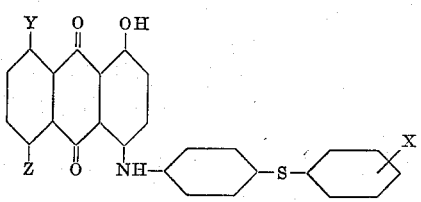

wherein X is hydrogen, Y and Z are chosen from the group consisting of OH, $NO_2$, Y being different from Z, which comprises condensing a dinitrodioxyanthraquinone in a high boiling solvent, at a temperature between 160°–210° C., with an amine of the type:

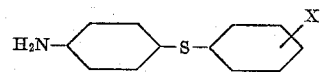

wherein X is as set forth above.

5. The process according to claim 4, wherein the condensation is carried out in alpha-chloronaphthalene.

6. The process according to claim 4, wherein the condensation is carried out in nitrobenzene.

7. Dyeing bath characterized by containing at least one dyestuff according to claim 1.

8. Polyester fibers, films, and other manufactured articles dyed in the dye bath according to claim 7.

9. Polyethylenterephthalate fibers, films and other manufactured articles dyed in the dye bath according claim 7.

10. The process of dyeing polyethylenterephthalate fibers and films, which comprises immersing said fibers and films in aqueous dye baths containing dyestuffs according to claim 1 at temperatures in the range 100°–150° C. and autogenous pressures.

References Cited

UNITED STATES PATENTS

| | | | |
|---|---|---|---|
| 2,845,443 | 7/1958 | Hindermann et al. | 260—380 X |
| 2,859,221 | 11/1958 | Hindermann et al. | 260—380 X |
| 2,945,867 | 7/1960 | Hoefle et al. | 260—380 |
| 2,843,448 | 7/1958 | Thummel et al. | 8—55 |
| 3,084,015 | 4/1963 | Grossmann et al. | 8—55 X |
| 3,097,909 | 7/1963 | Rhyner et al. | 8—55 X |
| 3,214,445 | 10/1965 | Hindermann et al. | 260—380 |
| 3,255,216 | 6/1966 | Hindermann et al. | 8—55 X |

NORMAN G. TORCHIN, *Primary Examiner.*

J. T. HERBERT, *Assistant Examiner.*